US012665688B2

(12) United States Patent
Vierimaa

(10) Patent No.: US 12,665,688 B2
(45) Date of Patent: Jun. 23, 2026

(54) METHOD OF GENERATING SIMULATED MULTIPATH FADING CHANNEL DATA

(71) Applicant: Siemens Industry Software Inc., Plano, TX (US)

(72) Inventor: Kari Vierimaa, Kempele (FI)

(73) Assignee: Siemens Industry Software Inc., Plano, TX (US)

( * ) Notice: Subject to any disclaimer, the term of this patent is extended or adjusted under 35 U.S.C. 154(b) by 320 days.

(21) Appl. No.: 18/686,417

(22) PCT Filed: Aug. 25, 2021

(86) PCT No.: PCT/IB2021/057783

§ 371 (c)(1),
(2) Date: Feb. 24, 2024

(87) PCT Pub. No.: WO2023/026078

PCT Pub. Date: Mar. 2, 2023

(65) Prior Publication Data

US 2024/0356661 A1      Oct. 24, 2024

(51) Int. Cl.
*H04B 17/391* (2015.01)
*H04L 5/00* (2006.01)
*H04W 56/00* (2009.01)

(52) U.S. Cl.
CPC ........ *H04B 17/3911* (2015.01); *H04L 5/0005* (2013.01); *H04W 56/0045* (2013.01)

(58) Field of Classification Search
CPC ........... H04W 56/0045; H04B 17/3911; H04B 17/3912; H04L 5/0005
See application file for complete search history.

(56) References Cited

U.S. PATENT DOCUMENTS

| | | |
|---|---|---|
| 5,862,455 A | 1/1999 | Martin |
| 2021/0345142 A1* | 11/2021 | Vierimaa .............. H04W 24/06 |

OTHER PUBLICATIONS

Haubrich, I.F.C.: "Theory and simulation of a wireless communication system based on orthogonal frequency division multiplexing: the limitations of OFDM in comparison with a single-carrier system"; Apr. 30, 2000; pp. 1-74; URL: https://pure.tue.nl/ws/portalfiles/portal/46793329/560971-1.pdf.

PCT International Preliminary Examination Report and Written Opinion of International Examination Authority mailed Nov. 8, 2023 corresponding to PCT International Application No. PCT/IP2021/057783.

* cited by examiner

*Primary Examiner* — Sulaiman Nooristany
(74) *Attorney, Agent, or Firm* — Lempia Summerfield Katz LLC

(57) ABSTRACT

A method of generating a simulated multipath fading channel data includes obtaining IQ sample data and selecting one or more radio samples from the IQ sample data for appending to the IQ sample data. The method also includes generating additional IQ sample data by appending the selected one or more radio samples prior to a start radio sample of the IQ sample data, and generating the simulated multipath fading channel using the additional IQ sample data, a predefined set of propagation delay, and attenuation coefficients associated with a channel model.

13 Claims, 3 Drawing Sheets

FIG 3

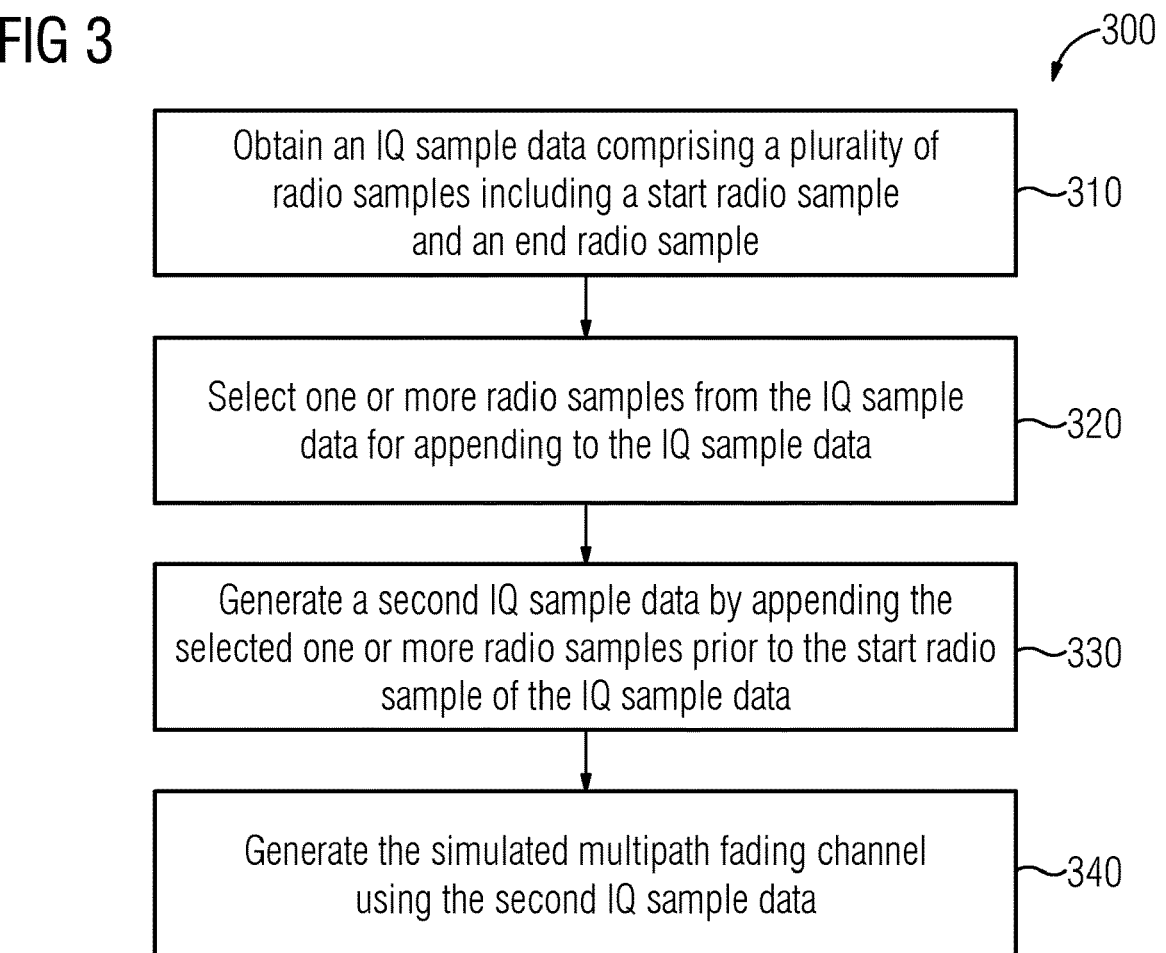

Obtain an IQ sample data comprising a plurality of radio samples including a start radio sample and an end radio sample ~310

Select one or more radio samples from the IQ sample data for appending to the IQ sample data ~320

Generate a second IQ sample data by appending the selected one or more radio samples prior to the start radio sample of the IQ sample data ~330

Generate the simulated multipath fading channel using the second IQ sample data ~340

FIG 4

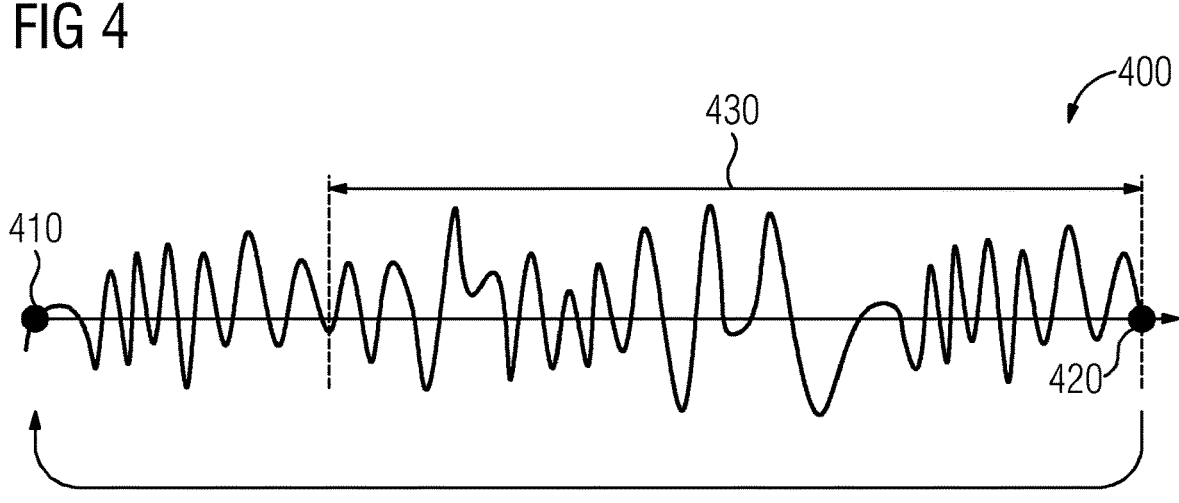

METHOD OF GENERATING SIMULATED MULTIPATH FADING CHANNEL DATA

This application is the National Stage of International Application No. PCT/IB2021/057783, filed Aug. 25, 2021. The entire contents of this document are hereby incorporated herein by reference.

BACKGROUND

The current disclosure relates to simulation and testing of radio devices and, more particularly, in relation to testing devices used for testing base stations and other radio equipment associated with cellular networks. Current testing systems used for testing of front haul networks may be software-based test systems and utilize software for testing of devices with signals generated simulating various environmental conditions. Such testing including multipath transmissions including reflection generated from surfaces present in the simulated environment.

SUMMARY AND DESCRIPTION

The current disclosure relates to testing of radio devices associated with cellular protocols using simulated test data generated using test software. The test software is used to simulate a plurality of transmissions including multipath fading transmission. Multipath Fading channel may be simulated using Tapped Delay Line (TDL) filters. Multipath Fading channel may be stimulated using ray-tracing and a Power Delay Profile (PDP). 3GPP specification study TR 39.901 specifies widely used PDP parameters of TDL filter for the 5G NR Channel Models. Accordingly, the IQ data associated with the signal to be transmitted is manipulated using the PDP parameters. However, since the IQ data is only of a predefined length, the IQ data is looped for the duration of the transmission test (e.g., which may be longer than the length of the IQ data).

However, due to such looping, one or more discontinuity points may be present in the resultant data generated subsequent to the manipulation of the IQ sample data. Such discontinuity is often desirable, and the presence of such discontinuity points may impact the testing of the radio device negatively. Accordingly, there is a need for a method and a device that addresses the issues discussed above.

Accordingly, the current disclosure describes a method of generating a simulated multipath fading channel data, a device of generating a simulated multipath fading channel data, and a non-transitory storage medium for generating a simulated multipath fading channel data, which address the above-mentioned issue.

Accordingly, the current disclosure describes a method of generating a simulated multipath fading channel data. The method includes obtaining an IQ sample data, selecting one or more radio samples from the IQ sample data for appending to the IQ sample data, generating a second IQ sample data by appending the selected one or more radio samples prior to the start radio sample of the IQ sample data, and generating the simulated multipath fading channel using the second IQ sample data and a predefined set of propagation delay and attenuation coefficients associated with a channel model.

Accordingly, the current disclosure describes a technique in which loop discontinuity points are eliminated from the resultant data by appending a section of radio samples before the start sample of the IQ sample data. The section of radio samples is selected from the back or end of the IQ sample data. Accordingly, by looping a part of the IQ sample data on itself prior to the generation of the multipath fading channel data, the issue of loop discontinuity is resolved without requiring substantial computational or time intensive operations to be performed.

The IQ sample data is a predetermined length and includes a plurality of radio samples including the start radio sample and the end radio sample. The selected one or more radio samples are within a first distance from the end radio sample of the IQ sample data.

In an example, the act of generating the simulated multipath fading channel data further includes determining one or more reflections of the IQ sample data based on the predefined set of propagation delay and attenuation coefficients, and determining a composite from the determined one or more reflections of the IQ sample data. In an example, generating the simulated multipath fading channel further includes adding a white noise component to each reflection from the one or more reflections of the IQ sample data prior to determining the composite. This allows for more accurate simulation of multipath fading channel via the usage of white noise.

The IQ sample data is in time domain or frequency domain. The start radio sample is the first sample in the sequence of the one or more radio samples of the IQ sample data, and the end radio sample is the last sample in the sequence of the one or more radio samples. In an example, the first distance is determined based on the channel model.

In an embodiment, the current disclosure describes a device for generating a simulated multipath fading channel. The device includes one or more processors connected to a memory module. The memory module (also referred to as a non-transitory storage module or medium) includes a plurality of instructions that, when executed on the one or more processors, cause the one or more processors to obtain an IQ sample data including a plurality of radio samples including a start radio sample and an end radio sample. The IQ sample data is a predetermined length. The plurality of instructions, when executed on the one or more processors, also cause the one or more processors to select one or more radio samples from the IQ sample data for appending to the IQ sample data, where the one or more radio samples are within a first distance from the end radio sample of the IQ sample data, generate a second IQ sample data by appending the selected one or more radio samples prior to the start radio sample of the IQ sample data, and generate the simulated multipath fading channel using the second IQ sample data and a predefined set of propagation delay and attenuation coefficients associated with a channel model. The advantages of the method are applicable to the device and the non-transitory storage medium mentioned above. These aspects are further explained below in relation to FIGS. 1-6.

BRIEF DESCRIPTION OF THE DRAWINGS

FIG. 3 illustrates a method for generating a simulated multipath fading channel data;

FIG. 4 illustrates an example IQ sample data of a predefined length, including a start radio sample and an end radio sample;

DETAILED DESCRIPTION

Figure 1:
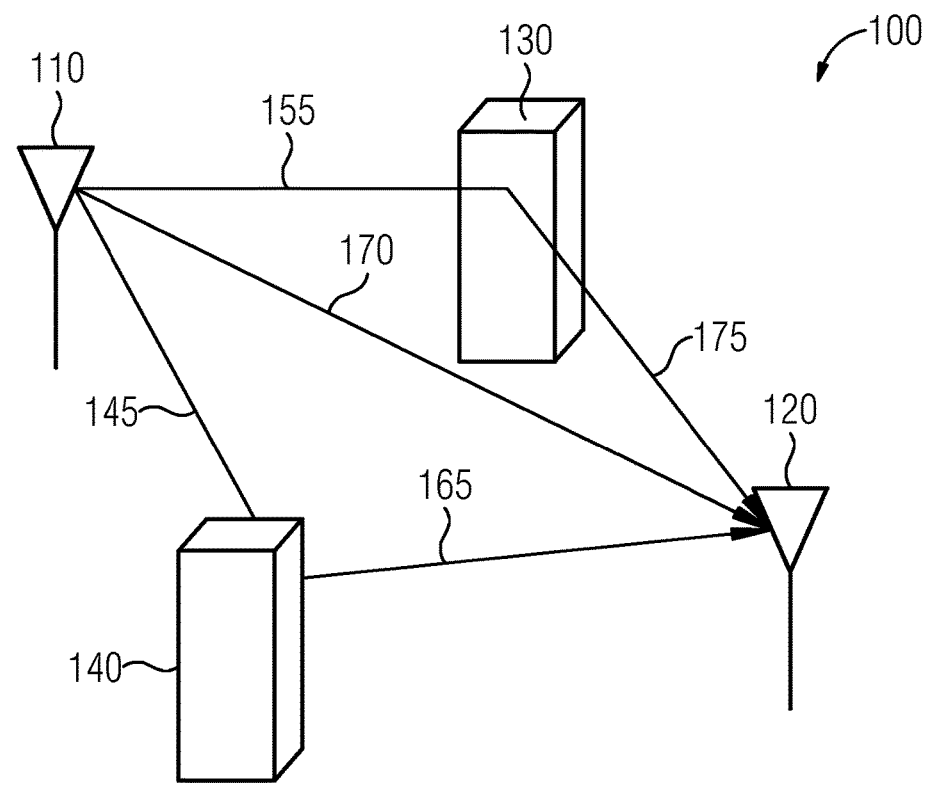
FIG. 1 illustrates an example multipath transmission with three paths from a radio source to a radio receiver.

FIG. 1 illustrates an example multipath transmission from an example radio source 110 to an example radio receiver 120. As shown in the FIG. 1, a transmission from the example radio source 110 to the example radio receiver 120 is a multipath transmission, and accordingly, a resultant signal at the radio receiver 120 is based on a signal from direct transmissions paths (shown in FIG. 1 as path 170) and reflected signals from indirect transmissions paths (shown in FIG. 1 as paths 155-175 and path 145-165). The reflected signals may undergo distortions and attenuation and may therefore be different than the original signal. Accordingly, such transmission is often simulated during testing of the radio devices, prior to deployment in industrial environments in order to regulate the reflections appropriately (e.g., either to reduce the reflections or to provide that reflections constructive interfere with each other). Testing of radio devices may be performed using simulated test data generated using test software. The test software is used to simulate a plurality of transmissions including multipath fading transmission. Multipath Fading channel may be simulated using Tapped Delay Line (TDL) filters. Multipath Fading channel may be stimulated using ray-tracing, and a Power Delay Profile (PDP). 3GPP specification study TR 39.901 specifies widely used PDP parameters of TDL filter for the 5G NR Channel Models. An example TDL filter 200 is shown in FIG. 2.

Figure 2:
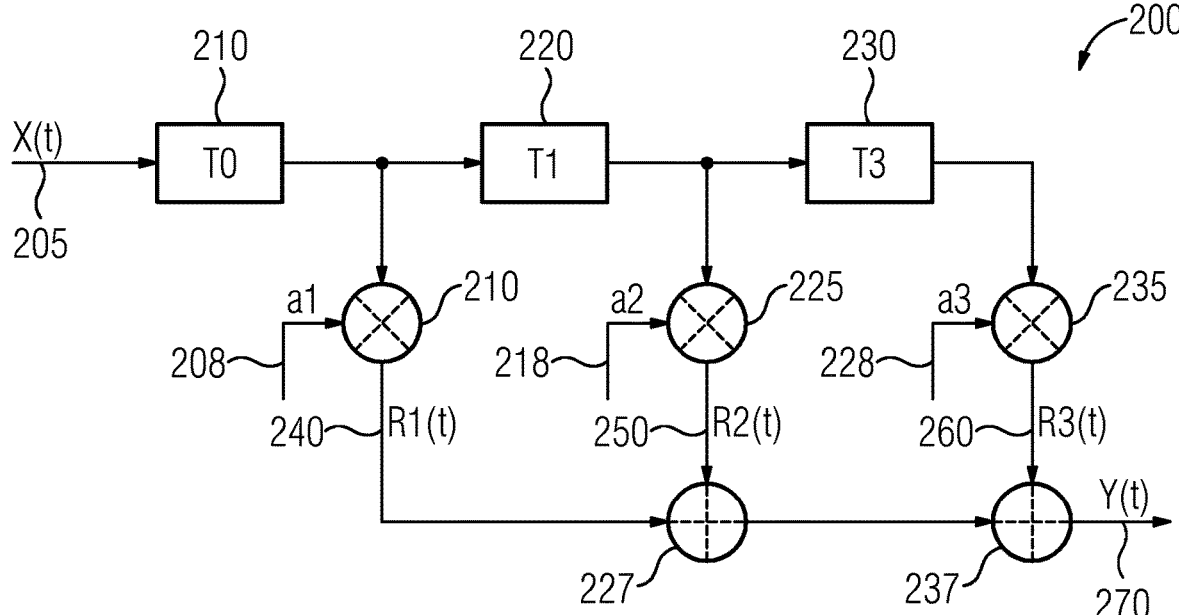
FIG. 2 illustrates an example of tapped delay filter used for simulating a multipath fading channel.

For example, as shown in FIG. 2, the example TDL filter 200 in accordance with an example channel model is used to generate the composite signal y(t) 270 of a multipath transmission from an input signal x(t) 205 that includes IQ sample data. The example TDL filter 200 is used to simulate the composite signal y(t), which is generated from the three reflections. The input signal x(t) is delayed by propagation delay coefficients and then multiplied by attenuation coefficients to generate the reflected signals. For example, the first reflected signal R1($t$) 240 is generated by delaying the input signal X(t) by the delay operation 210 according to delay coefficient T0 and then attenuated by the attenuation coefficient a1 208. The second reflected signal R2($t$) 250 is generated by delaying the input signal X(t) by the delay operation 220 according to delay coefficient T1, and then attenuated by the attenuation coefficient a2 218. The third reflected signal R3 ($t$) 260 is generated by delaying the input signal X(t) by the delay operation 230 according to delay coefficient T3, and then attenuated by the attenuation coefficient a3 228. Subsequent to the generation of the reflected signals R1($t$), R2($t$), and R3($t$), the reflected signals R1($t$), R2($t$) and R3($t$) are combined together to generate the composite signal y(t). The input signal x(t) is preprocessed by looping a part of the input signal x(t) in order to address discontinuity issues. This is further explained in the description of FIG. 3.

FIG. 3 illustrates a method 300 of generating a simulated multipath fading channel data. The method 300 is implemented by a test device (not shown in FIG. 3). At act 310, the test device obtains an IQ sample data 400 (as shown in FIG. 4). The IQ sample data 400 is indicative of the input signal. The IQ sample data 400 is of a predetermined length and includes a plurality of radio samples including a start radio sample 410 and an end radio sample 420. In an example, the IQ sample data is generated by a test simulation software of the test device. In another example, the IQ sample data is generated by a radio device when running a test scenario.

At act 320, the test device selects one or more radio samples 430 from the IQ sample data 400 for appending to the IQ sample data 400. The one or more radio samples 430 are within a first distance from the end radio sample 420 of the IQ sample data 400. As mentioned previously, the IQ sample data 400 includes a plurality of radio samples, however, to create a looping IQ sample data, and a portion of the radio samples (e.g., the one or more radio samples) towards the end of the IQ sample data is selected for looping. The portion of radio samples is selected based on a first distance of the radio samples from the end radio sample 420. Based on the first distance, the one or more radio samples are selected. For example, if the distance is 20 samples, the last 20 samples (e.g., including the end sample 430) are selected. The first distance is determined based on the channel model.

At act 330, the test device generates a second IQ sample data by appending the selected one or more radio samples 430 prior to the start radio sample 410 of the IQ sample data 400. The sequence of the one or more radio samples 430 is unchanged or retained, and the appending operation is performed such that the copy of the end sample 420 in the one or more radio samples immediately precedes the start sample 410 of the IQ sample data 400. Accordingly, the second IQ sample data is longer than the original IQ sample data 400, and therefore, when shifted by the delay operations of the tapped delay filter, the shifted second IQ data does not have discontinuity points.

Figure 5:
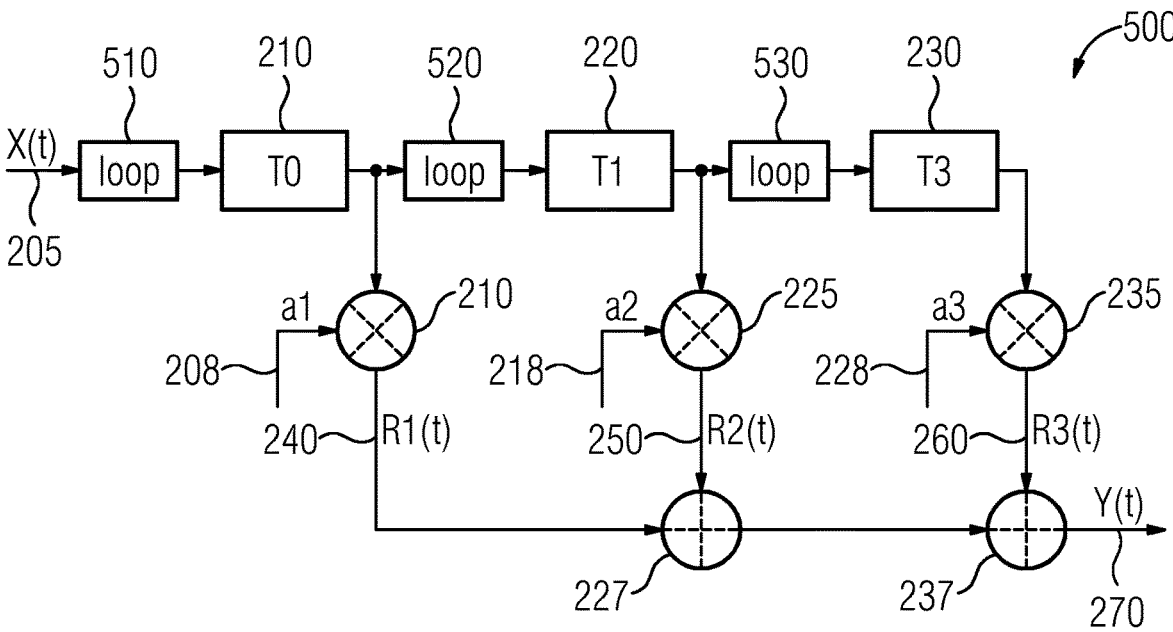
FIG. 5 illustrates a modified tapped delay filter 500 including one or more loop operations.
Figure 6:
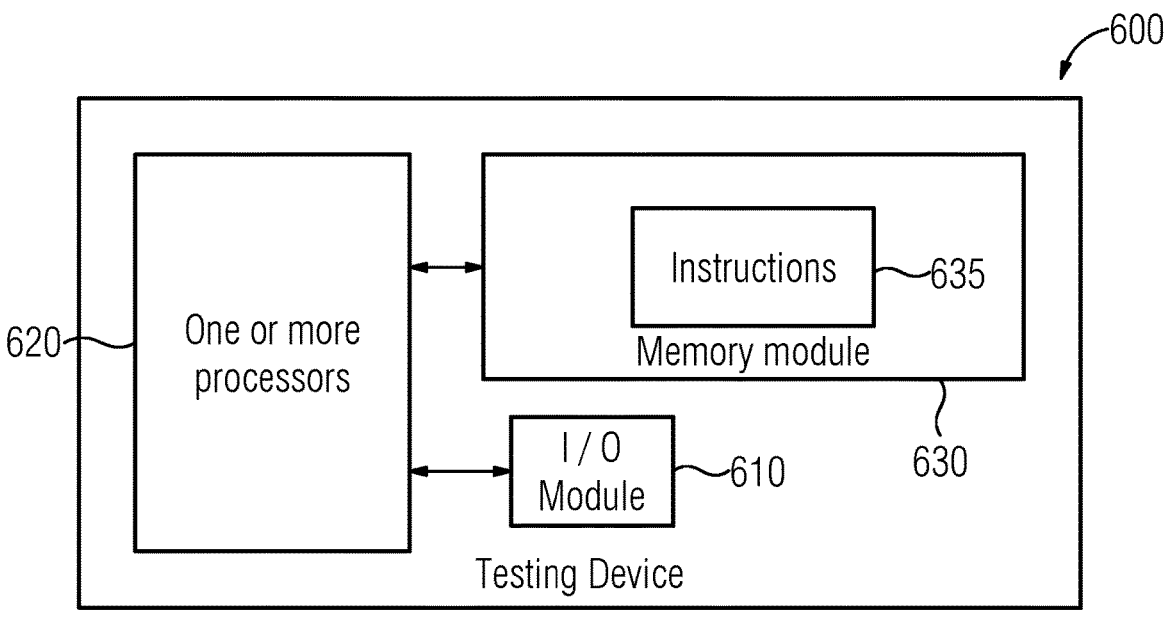
FIG. 6 illustrates a testing device for generating a simulated multipath fading channel data.

At act 340, the test device generates the simulated multipath fading channel using the second IQ sample data and a predefined set of propagation delay and attenuation coefficients associated with a channel model. Using the second IQ sample data, one or more reflections (e.g., 175, 165) of the IQ sample data 400 is determined based on the predefined set of propagation delay and attenuation coefficients, and then, a composite is determined from the one or more reflections of the IQ sample data 400. The predefined set of propagation delay (e.g., T0, T1, and T2) and attenuation coefficients (e.g., a1, a2, and a3) may be realized using the tapped delay filter 200 as shown in FIG. 2. Accordingly, the second IQ sample may be provided as the input to the tapped delay filter 200. The above acts 310, 320, and 330 may be carried out at the input prior to each delay operation of the tapped delay filter 200. For example, as mentioned above, the second input sample is provided to the delay operation 210 after the acts 310, 320 and 330 are performed to generate the second input sample. Then, a result of the delay operation 210 is looped using the acts 310, 320, and 330 and then provided to the delay operation 220. Similarly, a result of the delay operation 220 is looped using the acts 310, 320, and 330 and then provided to the delay operation 230. This is further illustrated in FIG. 5, which illustrates a modified tapped delay filter 500 containing one or more loop operations (e.g., 510, 520 and 530). The tapped delay filter 500 is similar to the tapped delay filter 200 and includes the same components/operations as the tapped delay filter 200. However, in addition to the previously mentioned components/operations, the tapped delay filter 500 includes a loop operation (e.g., 510, 520 and 530) for looping the IQ sample data in accordance with the acts 310, 320, and 330 of the above method prior to each delay operation (e.g., 210, 220 and 230).

It may be noted by a person skilled in the art that the above method is explained using IQ sample data in time domain; the method is also applicable to IQ sample data in frequency domain. In an example, since the reflections may introduce randomness, the method 300 includes adding a white noise component to each reflection (e.g., 175, 165) from the one or more reflections (e.g., 175, 165) of the IQ sample data 400 prior to determining the composite.

While the above method 300 is explained in relation to a test device, the above method may be realized in another device or a plurality of devices. For example, the method 300 may be implemented in a network management device or a test data generator. Accordingly, the present disclosure may take the form of a computer program product including program modules accessible from computer-usable or computer-readable medium storing program code for use by or in connection with one or more computers, processing units, or instruction execution system.

Accordingly, the current disclosure describes a device 600 for simulating generating a simulated multipath fading channel. The device 600 includes an I/O module 610 to receive and transmit test data including composite data associated with the simulated multipath fading channel, one or more processors 620 connected to a memory module 630 (e.g., also referred to as non-transitory storage medium 630). The memory module 630 includes a plurality of instructions 635 that, when executed by the one or more processors 620, cause the one or more processors 620 to obtain an IQ sample data 400 including a plurality of radio samples including a start radio sample 410 and an end radio sample 420, where the IQ sample data 400 is a predetermined length. The plurality of instructions 635, when executed by the one or more processors 620, also cause the one or more processors 620 to select one or more radio samples 430 from the IQ sample data 400 for appending to the IQ sample data 400, where the one or more radio samples 430 are within a first distance from the end radio sample 420 of the IQ sample data 400, generate a second IQ sample data by appending the selected one or more radio samples 430 prior to the start radio sample 410 of the IQ sample data 400, and generate the simulated multipath fading channel using the second IQ sample data and a predefined set of propagation delay and attenuation coefficients associated with a channel model.

For the purpose of this description, a computer-usable or computer-readable non-transitory storage medium may be any apparatus that may contain, store, communicate, propagate, or transport the program for use by or in connection with the instruction execution system, apparatus, or device. The medium may be electronic, magnetic, optical, electromagnetic, infrared, or a semiconductor system (e.g., or apparatus or device), or propagation mediums in and of themselves as signal carriers are not included in the definition of physical computer-readable medium, which includes a semiconductor or solid state memory, magnetic tape, a removable computer diskette, random access memory (RAM), a read only memory (ROM), a rigid magnetic disk, and optical disk such as compact disk read-only memory (CD-ROM), compact disk read/write, and DVD. Both processing units and program code for implementing each aspect of the technology may be centralized or distributed (or a combination thereof) as known to those skilled in the art.

In view of the present disclosure, many modifications and variations would present themselves to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to device/non transitory storage medium claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of generating simulated multipath fading channel data by a test device for testing radio devices, the method comprising:
   obtaining first IQ sample data comprising a plurality of radio samples including a start radio sample and an end radio sample, wherein the first IQ sample data is of a predetermined length, wherein the first IQ sample data is looped for a duration of a transmission test by:
      selecting one or more radio samples from the first IQ sample data for appending to the IQ sample data, wherein the one or more radio samples are within a first distance from the end radio sample of the IQ sample data;
      generating second IQ sample data, the generating of the second IQ sample data comprising appending the selected one or more radio samples prior to the start radio sample of the IQ sample data; and
      generating the simulated multipath fading channel data using the second IQ sample data and a predefined set of propagation delay and attenuation coefficients associated with a channel model, the generating of the simulated multipath fading channel data comprising providing the second IQ sample data as an input to a tapped delay filter, the tapped delay filter including one or more loop operations.

2. The method of claim 1, wherein generating the simulated multipath fading channel comprises;
   determining one or more reflections of the first IQ sample data based on the predefined set of propagation delay and attenuation coefficients; and
   determining composite data from the determined one or more reflections of the first IQ sample data.

3. The method of claim 1, wherein the first IQ sample data is in time domain or frequency domain.

4. The method of claim 1, wherein the start radio sample is a first sample in a sequence of the plurality of radio samples of the first IQ sample data, and the end radio sample is a last sample in the sequence of the plurality of radio samples.

5. The method of claim 1, wherein the first distance is determined based on the channel model.

6. The method of claim 2, wherein generating the simulated multipath fading channel further comprises adding a white noise component to each reflection from the one or more reflections of the first IQ sample data prior to determining the composite.

7. A test device for generating simulated multipath fading channel data, the test device comprising:

one or more processors connected to a memory module, the one or more processors configured to:

obtain first IQ sample data comprising a plurality of radio samples including a start radio sample and an end radio sample, wherein the first IQ sample data is a predetermined length, wherein the first IQ sample data is looped for a duration of a transmission test by:

selection of one or more radio samples from the first IQ sample data for appending to the first IQ sample data, wherein the one or more radio samples are within a first distance from the end radio sample of the first IQ sample data;

generation of a second IQ sample data, the generation of the second IQ sample data comprising appendment of the selected one or more radio samples prior to the start radio sample of the first IQ sample data; and generation of the simulated multipath fading channel data using the second IQ sample data and a predefined set of propagation delay and attenuation coefficients associated with a channel model, the generation of the simulated multipath fading channel data comprising provision of the second IQ sample data as input to a tapped delay filter, the tapped delay filter including one or more loop operations.

8. A non-transitory computer-readable storage medium that stores instructions executable by one or more processors for simulating generating simulated multipath fading channel data by a test device for testing radio devices, the instructions comprising:

obtaining first IQ sample data comprising a plurality of radio samples including a start radio sample and an end radio sample, wherein the first IQ sample data is a predetermined length, wherein the first IQ sample data is looped for a duration of a transmission test by;

selecting one or more radio samples from the first IQ sample data for appending to the first IQ sample data, wherein the one or more radio samples are within a first distance from the end radio sample of the first IQ sample data;

generating second IQ sample data, the generating of the second IQ sample data comprising appending the selected one or more radio samples prior to the start radio sample of the first IQ sample data; and generating the simulated multipath fading channel data using the second IQ sample data and a predefined set of propagation delay and attenuation coefficients associated with a channel model, the generating of the simulated multipath fading channel data comprising providing the second IQ sample data as an input to a tapped delay filter, the tapped delay filter including one or more loop operations.

9. The non-transitory computer-readable storage medium of claim 8, wherein generating the simulated multipath fading channel comprises:

determining one or more reflections of the first IQ sample data based on the predefined set of propagation delay and attenuation coefficients; and determining composite data from the determined one or more reflections of the first IQ sample data.

10. The non-transitory computer-readable storage medium of claim 8, wherein the first IQ sample data is in time domain or frequency domain.

11. The non-transitory computer-readable storage medium of claim 8, wherein the start radio sample is a first sample in a sequence of the plurality of radio samples of the first IQ sample data, and the end radio sample is a last sample in the sequence of the plurality of radio samples.

12. The non-transitory computer-readable storage medium of claim 8, wherein the first distance is determined based on the channel model.

13. The non-transitory computer-readable storage medium of claim 9, wherein generating the simulated multipath fading channel further comprises adding a white noise component to each reflection from the one or more reflections of the first IQ sample data prior to determining the composite.

* * * * *